June 5, 1934.     R. A. BEACH     1,961,328
PORTABLE GRINDER FOR SHARPENING KNIVES
Filed Feb. 27, 1933
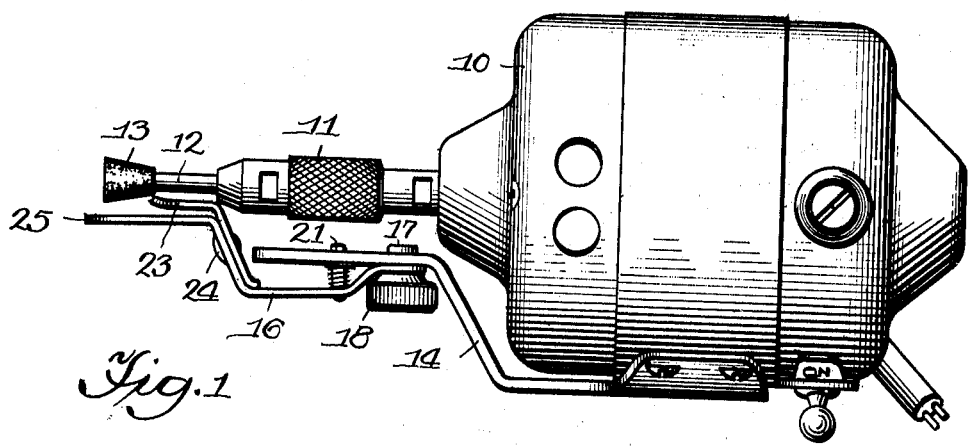
Fig.1
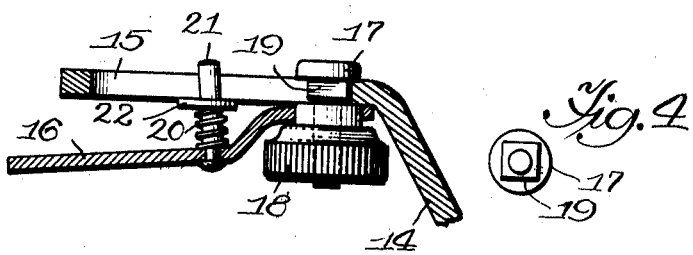
Fig.3        Fig.4
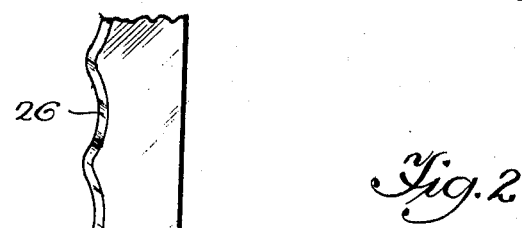
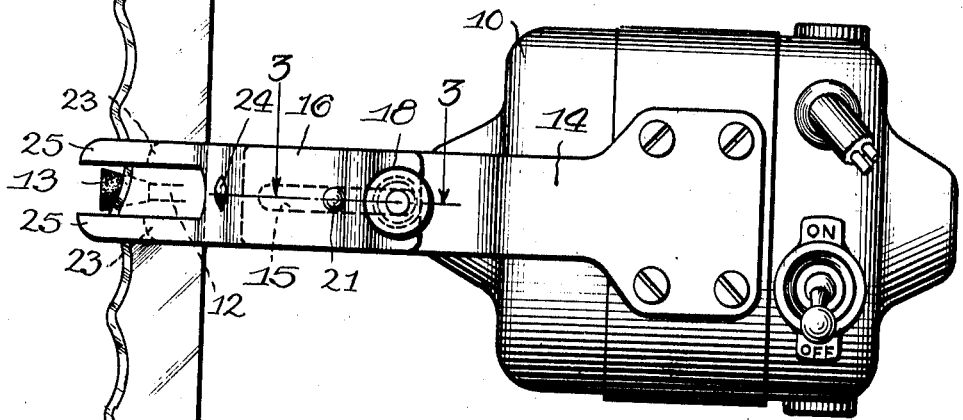
Fig.2
Inventor,
Royal A. Beach,
George Bryan Jones, Atty.
Witness:

Patented June 5, 1934

1,961,328

UNITED STATES PATENT OFFICE 1,961,328

PORTABLE GRINDER FOR SHARPENING KNIVES

Royal A. Beach, Racine, Wis., assignor to The Dumore Company, a corporation of Wisconsin Application February 27, 1933, Serial No. 658,845

8 Claims. (Cl. 51—102)

My invention relates to improvements in portable grinders adapted particularly for sharpening knives.

Commercial machines for slicing and wrapping bread are often equipped with from twenty to forty cutting knives which have scalloped cutting edges and which reciprocate in a vertical plane when in action. It is essential that these knives be kept sharp in order that they may operate effectively. By the sharpening method heretofore employed, it may require as much as four hours time to sharpen all the knives on the machine, the operation being more difficult than in the case of an ordinary kitchen knife because of the fact that the edges are not practically straight but are scalloped and the knives themselves are not as accessible, as they are arranged in close formation in the machine, only three eighths of an inch or more apart.

The general object of my invention is to provide a small, portable grinder which may be held in the hand and moved up and down over bread knives of this character, as well as other knives, to provide a very sharp cutting edge in a short period of time.

A specific object is to provide an elongated, motor driven grinding wheel of such small diameter that it may be introduced between the closely spaced knives of a bread slicing machine in order to sharpen said knives without removing them from said machine.

Contributory objects are, to provide an electric grinder with a small elongated grinding member on the end of the motor shaft, the axis of rotation of said shaft being more or less parallel to the planes of the blades to be ground; to equip the tool with a guide embracing opposite sides of the knife to be ground, the shaft of the grinding wheel being pivotally mounted with respect to said guide so that said grinding wheel may be pressed against the scalloped portions of the knife edges with the required pressure as the grinder is moved slowly up or down.

A further object is to provide a portable grinder with a small cone shaped grinder associated with an adjustable guide which is relatively movable with reference to said grinder.

In the accompanying drawing I have illustrated one embodiment of the invention:

Fig. 1 is a top plan view of the preferred commercial form;

Fig. 2 is a side elevation thereof;

Fig. 3 is an enlarged section on the line 3—3 of Fig. 2; and

Fig. 4 is an end view of a bolt.

The grinder comprises a small electric motor 10 which may be conveniently held in the hand. The armature shaft carries a suitable chuck 11 into which the shaft 12 of a small grinding wheel or emery wheel 13 may be inserted and clamped in place. Where the grinder is to be used for sharpening bread knives, a cone shaped grinder is preferably employed, the small end of the cone adjoining the shaft 12, the opposite end being the large end or base of the cone. A guide, or device to assist in applying the device to the blades and holding the motor with the grinding wheel against the blade to be sharpened, is secured to the motor. It may have the form of a metal plate 14 secured to the motor casing, its other end being preferably parallel to the axis of the motor shaft and having a slot 15 therein. An extension or sheet metal part 16 is pivotally secured to the plate 14 so as to permit a slight relative movement of the two. The parts are held together by a bolt 17 having a knurled nut 18 thereon, with a portion of reduced diameter received in an opening in said part 16, and constituting the pivotal connection of the two parts. As shown in Figs. 3 and 4, the head of the screw has under cut portions providing a square cross-section having flat surfaces 19, the reduced section fitting within the slot 18 and being slidable therein to vary the effective length of the combined pieces 14 and 16. The flat surfaces prevent rotation of the head of the screw when the knurled nut 18 is being tightened.

The adjacent portions of the metal plates or strips 14 and 16 are normally pressed away from each other by a spring 20 which surrounds a pin 21, one end of which is riveted in an opening in the metal strip 16, with the outer end protruding through the slot 15 in plate 14. Said spring is confined between said strip 16 and a washer 22 which spans said slot.

A guard or extension 23, having a forked end, is secured to the metal strip 16 at 24 as by means of a rivet, being spaced from the forked end 25 of said strip 16. This clearance space is sufficient to permit the end of the guide member to be slipped over the knife 26, the scalloped edge of which is to be sharpened, and thus aids the operator in holding the motor in the proper position with respect to said knife and in swinging the motor and the cone shaped grinder thereon, inwardly against the knife edge about the end of the metal strip 16 as a pivot, the connection afforded by the screw 17 and knurled nut 18 permitting the slight turning action necessary. The spring 20 holds the bifurcated end of the guide (the spaced members 23 and 25) away from the emery wheel, while said guide is being slipped over the blade to be sharpened, and is being withdrawn therefrom.

It will be noted that the unsharpened edge of the knife blade is nearest the motor, the sharp or scalloped edge facing away from the motor. As the grinder is moved up and down, that portion of the guide member consisting of the metal strip 16 and auxiliary strip 23, remain comparatively fixed except for the up and down movement thereof, the motor and the plate 14 being swung slightly about a vertical axis to bring the grinder against the knife edge. The grinder as a whole, may, of course, be moved slightly toward or away from the knife, as may be required during the sharpening operation. Furthermore, the slotted connection between the metal plates 14 and 16 permit adjustment of the outer end of the guide toward or away from the motor to insure that the grinder 13 will be positioned opposite the openings in the end pieces 23 and 25 as shown in Fig. 2, i. e. the forked portions of each. These blades are tapered on both sides of the scalloped edge.

The cone shaped grinder is preferable for the particular type of knife illustrated herein, but various other forms of grinding wheels may of course be used, depending on the article to be sharpened, and the shape of the outer end of the guide may be varied to adapt it to said article. Various other changes in the shape and location of parts may be made without departing from the invention.

I claim:

1. A portable grinder for knives having scalloped edges, comprising a motor having an extended armature shaft, a grinding wheel thereon, a frame secured to the motor housing to serve as a guide to maintain the proper relation between said grinding wheel and knife, said frame having at its outer end spaced members to embrace opposite sides of the knife and being pivotally mounted whereby the distance between said members and said grinding wheel may be varied to permit said knife to be ground by the curved surface of said grinding wheel.

2. A portable grinder for a series of parallel bread knives comprising a motor having an armature shaft, a grinding wheel thereon and a guide secured to the motor casing having a bifurcated end adjacent said grinding wheel but spaced therefrom sufficiently to receive a knife blade when said armature shaft is substantially parallel to the plane of said blade.

3. A portable grinder for a gang of spaced, parallel bread knives comprising a motor having an armature shaft, a grinding wheel thereon and a guide secured to the motor casing having an end adjacent said grinding wheel and bifurcated in two planes, the diameter of said grinding wheel being less than the distance between adjacent blades whereby said grinding wheel may be moved into position on one side of a blade and said guide on the other side of said blade, said blade being received in one of said bifurcations, said other bifurcation providing a clearance for said grinding wheel.

4. A portable grinder comprising a motor, a cone shaped grinding wheel mounted on the motor shaft, a pair of spaced apart members adjacent said grinding wheel to fit over the part to be ground, said members being yieldingly supported on said motor to permit them to move toward said grinding wheel and one of said members having an opening therein to provide a clearance between itself and said grinding wheel.

5. A device of the class described comprising an electric motor comprising a frame and an armature shaft, an axial extension on said shaft, a cone shaped grinding wheel secured to said extension with the small end toward said motor, a guide secured to the motor frame and pivoted to permit movement toward said grinding wheel and an opening in said guide opposite said grinding wheel, to provide a clearance for said grinding wheel at the limit of such movement.

6. A device of the class described comprising an electric motor, a cone shaped grinding wheel secured to the motor shaft with the small end toward said motor, a guide secured to the motor frame consisting of two parts, one of which is slotted and a bolt passing through said slot and adjustably holding said parts together, the remote end of said guide being close to the conical surface of said grinding wheel to permit the insertion of a blade edgewise between the two.

7. A device of the class described comprising a motor having an elongated armature shaft, a grinding wheel thereon at a point remote from said motor, a metal plate secured to said motor and having a slot therein, an extension member for said plate having a pair of openings therein, a bolt having its head non-rotatably mounted in said slot passing through one of said openings, a knurled nut for holding said parts loosely together, a pin secured to said extension member and projecting through said slot and a spring surrounding said pin and pressing the adjacent members apart about said nut as a pivot, the other opening being located near said grinding wheel to permit the latter to clear said extension member when moved toward it against the action of said spring.

8. A small portable grinder to be held between the parallel blades of a gang of bread knives spaced apart a fraction of an inch and having the tapering edges all on one side and the blunt edges on the other side, comprising a motor of a size to be held in the hand, an armature shaft extension therefor, a small conical grinding wheel on said extension, with its small end toward said motor, and a guide secured to said motor and terminating near said grinding wheel substantially parallel to the axis of said conical grinding wheel, leaving a small clearance to receive the blunt side of one of said blades to be ground, and a stop on said guide to engage said blunt side and insure positioning said conical grinding wheel adjacent the tapering edge, to permit sharpening the same.

ROYAL A. BEACH.